(12) United States Patent
Nakatsuka et al.

(10) Patent No.: US 7,093,569 B2
(45) Date of Patent: Aug. 22, 2006

(54) POWER UNIT FOR SADDLE-RIDE TYPE VEHICLE

(75) Inventors: Masahiko Nakatsuka, Saitama (JP); Kazuhisa Takemoto, Saitama (JP); Shigetaro Okano, Saitama (JP); Yoshinobu Ozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/063,571

(22) Filed: Feb. 24, 2005

(65) Prior Publication Data

US 2005/0193965 A1    Sep. 8, 2005

(30) Foreign Application Priority Data

Mar. 4, 2004    (JP) ............... 2004-060698

(51) Int. Cl.
*F02B 75/00* (2006.01)
*F01P 5/10* (2006.01)
*F01M 1/00* (2006.01)

(52) U.S. Cl. .................. 123/41.44; 123/196 AB; 123/196 R

(58) Field of Classification Search ............. 123/41.44, 123/196 AB, 196 R
See application file for complete search history.

(56) References Cited

U.S. PATENT DOCUMENTS 4,339,964 A    7/1982  Isaka 6,257,178 B1    7/2001  Laimbock
6,499,443 B1 *  12/2002  Kawamoto et al. ...... 123/41.44

FOREIGN PATENT DOCUMENTS

| DE | 19910271 A1 | 9/2000 |
|---|---|---|
| EP | 1394382 A1 | 3/2004 |
| JP | 3 210019 A | 9/1991 |
| JP | 2741078 B2 | 4/1998 |

* cited by examiner

*Primary Examiner*—Henry C. Yuen
*Assistant Examiner*—Hyder Ali
(74) *Attorney, Agent, or Firm*—Birch, Stewart, Kolasch & Birch, LLP

(57) ABSTRACT

An internal combustion engine and a transmission are supported by a saddle-ride type vehicle body having a front wheel in a front portion thereof. An oil cooler is installed without interference with other parts such as, for example, an exhaust pipe and the front wheel. Further, the distance between a water pump and the oil cooler is made shorter to shorten the length of a cooling water pipe. The power unit includes a crank shaft, an output shaft disposed in a rear portion of the power unit to output torque produced by the crank shaft to the exterior through a transmission, a water pump is adapted to be rotated with the torque transferred thereto from the crank shaft, and an oil cooler mounted on a rear surface of the power unit in a vehicle advancing direction below the output shaft and at a position lower than the crank shaft.

15 Claims, 16 Drawing Sheets

POWER UNIT FOR SADDLE-RIDE TYPE VEHICLE

BACKGROUND OF THE INVENTION

CROSS-REFERENCE TO RELATED APPLICATIONS

The present non-provisional application claims priority under 35 USC 119 to Japanese Patent Application No. 2004-060698 filed on Mar. 4, 2004 the entire contents thereof is hereby incorporated by reference.

1. Field of the Invention

The present invention relates to a power unit for a saddle-ride type vehicle. More particularly, the present invention is concerned with a layout of an oil cooler, an oil filter, an oil pump, a water pump, and an output shaft.

2. Description of Background Art

According to an example of a conventional power unit provided with a V engine, an oil cooler and an oil filter are provided sideways of a crank case and project to the exterior of the power unit. See, Japanese Patent No. 2741078. When such a V engine is to be mounted on a saddle-ride type vehicle such as a two-wheeled motor vehicle, it is necessary to ensure an adequate mounting space for other parts while avoiding the oil cooler and the oil filter. However, in a saddle-ride type vehicle such as a two-wheeled motor vehicle it is not easy to ensure such a mounting space.

According to another conventional example of a layout, an oil cooler is disposed below a crank shaft, while a water pump is disposed above the crank shaft Japanese Patent No. 2741078. In such a layout, a cooling water passage becomes long and complicated, which is not desirable in the fabrication of a power unit.

SUMMARY AND OBJECTS OF THE INVENTION

The present invention intends to provide means for installing an oil cooler and an oil filter without interference with other parts such as, for example, an exhaust pipe and a front wheel and also intends to position a water pump and an oil cooler closer to each other and thereby shorten the length of a cooling water pipe.

The present invention has solved the above-mentioned problems. According to the present invention, in a power unit for a saddle-ride type vehicle, including an internal combustion engine and a transmission and supported by a saddle-ride type vehicle body having a front wheel in a front portion thereof, a crank shaft is provided that is adapted to rotate and produce torque with the combustion in the internal combustion engine. An output shaft is disposed in a rear portion of the power unit in a vehicle advancing direction to output the torque produced by the crank shaft to the exterior through the transmission. A water pump is disposed below the crank shaft and is adapted to be rotated with the torque transferred thereto from the crank shaft. An oil cooler is mounted on a rear surface of the power unit in the vehicle advancing direction below the output shaft and at a position lower than the crank shaft.

According to the present invention there is provided a power unit for a saddle-ride type vehicle, including a left crank case and a right crank case, and wherein the oil cooler is fixed to a rear surface in the vehicle advancing direction of at least one of the left crank case and the right crank case, and the water pump is disposed within the crank case to which the oil cooler is fixed.

According to the present invention there is provided a power unit for a saddle-ride type vehicle wherein the transmission is accommodated within an internal space formed by combining of the left and right crank cases which constitute the power unit. The oil pump is disposed within at least one of the left and right crank cases, and the oil cooler is fixed to a rear surface in the vehicle advancing direction of the crank case in which the oil pump is disposed.

According to the present invention there is provided a saddle-ride type power unit wherein the output shaft of the transmission is disposed at a position higher than an input shaft of the transmission.

According to the present invention there is provided a power unit for a saddle-ride type vehicle wherein a rotary shaft of the oil pump and a rotary shaft of the water pump are coaxially disposed and interlocked with each other.

In the present invention, the water pump and the oil cooler are disposed below the crank shaft, and the oil cooler is provided on the rear surface of the power unit in the vehicle advancing direction and below the output shaft. Therefore, the oil cooler can be installed by utilizing a dead space and the water pump can disposed adjacent to the oil cooler, whereby it is possible to shorten the cooling water passage and simplify the structure.

In the present invention, the crank case includes the left crank case and the right crank case, and the oil pump and the oil cooler are disposed in one of the cases. Therefore, the oil passage can be disposed intensively within one crank case and the water pump can be disposed by effectively utilizing the resulting empty space in the other crank case.

In the present invention, since the output shaft of the transmission is disposed at a position higher than the input shaft thereof, it is possible to shorten the overall length of the power unit.

In the present invention, since the rotary shaft of the oil pump and rotary shaft of the water pump are coaxially disposed and interlocked with each other, a single drive means suffices as a common means. Thus, the structure of the power unit is simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
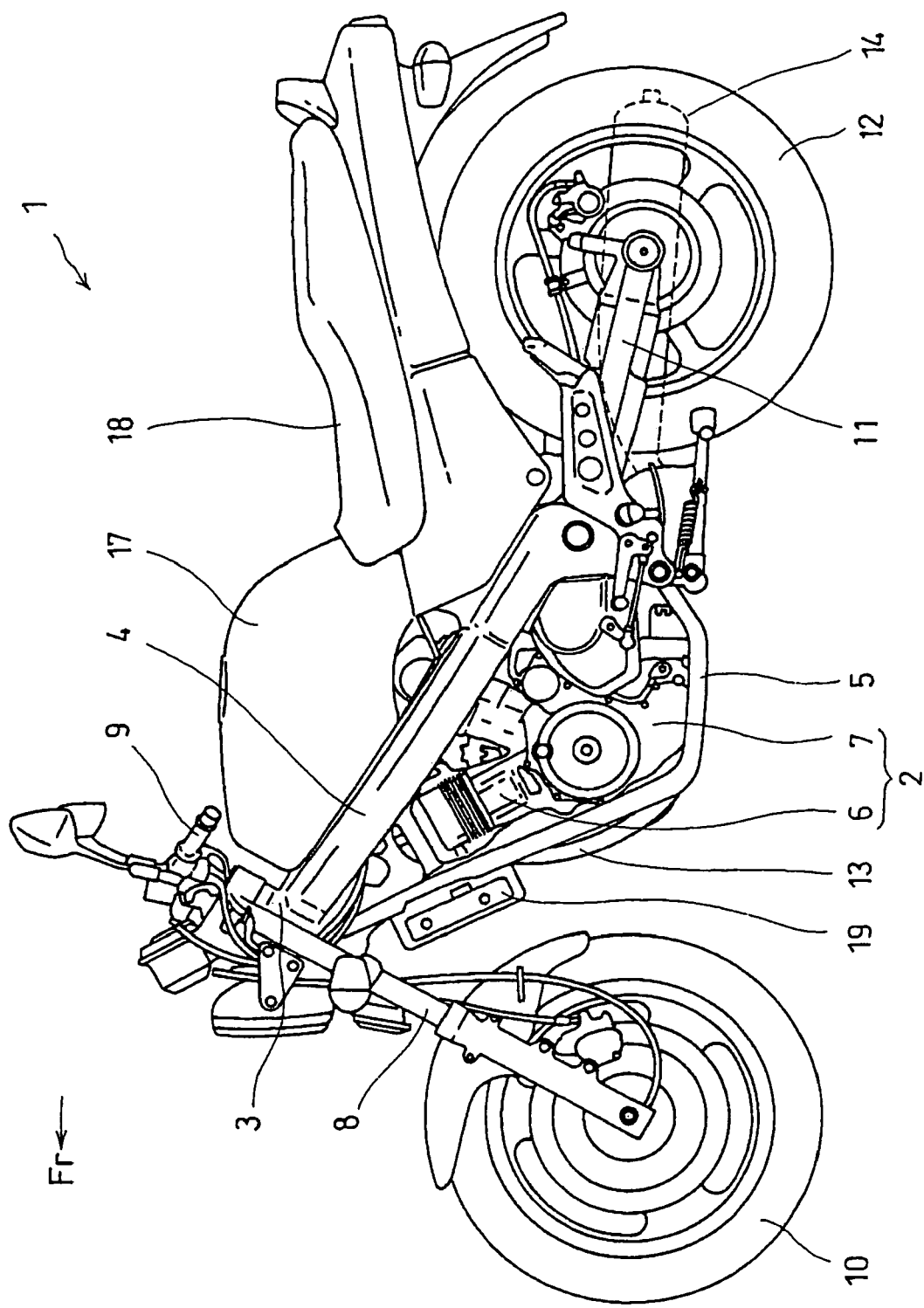
FIG. 1 is a side view of a saddle-ride type two-wheeled motor vehicle 1 provided with a power unit 2 according to a first embodiment of the present invention.

FIG. 1 is a side view of a saddle-ride type two-wheeled motor vehicle 1 provided with a power unit 2 according to a first embodiment of the present invention. In the two-wheeled motor vehicle 1 there are provided a pair of main frames 4 contiguous to a head pipe 3 and inclined rearwardly and downwardly and a pair of sub-frames 5 extending downwardly from a lower portion of the head pipe 3 and being bent rearwardly with rear end portions of the sub-frames 5 being connected to rear end portions of the main frames 4.

The power unit 2, which is an integral combination of an internal combustion engine 6 and a transmission 7, is mounted within a space formed by the main frames 4 and the sub-frames 5 which space is generally triangular in a side view. A front fork 8 is supported pivotably by the head pipe 3 and a steering handle 9 is mounted to an upper end of the front fork 8, while a front wheel 10 is supported at a lower end of the front fork through an axle. Front ends of a pair of rear forks are supported by the rear end portions of the main frames 4 so as to be pivotable vertically. Rear shock absorbers (not shown) are mounted between central positions of the rear forks 11 and the rear end portions of the main frames 4, and a rear wheel 12 is supported at rear ends of the rear forks 11 through an axle.

The internal combustion engine 6 is a water-cooled, V-shaped, 2-cylinder, internal combustion engine with the cylinders being disposed in a V-shaped open state in the longitudinal direction. A crank shaft of the internal combustion engine 6 is disposed in the transverse direction of the vehicle orthogonal to the vehicle advancing direction. A transmission shaft of the transmission 7 is parallel to the crank shaft. A rear wheel drive shaft (not shown) is connected to a connection shaft (FIG. 2) orthogonal to an output shaft of the transmission and extends rearwardly of the vehicle up to the rear wheel 12 to drive the rear wheel.

An exhaust pipe 13, contiguous to an exhaust port, is formed between the two cylinders and extends forward of the internal combustion engine 6, passes below the transmission 7, reaches a rear portion of the vehicle body, and is connected to an exhaust muffler 14. A fuel tank 17 is mounted over the main frames 4 and a seat 18 is installed behind the fuel tank 17. The internal combustion engine 6 is a water-cooled type with water, whose temperature has been raised in the course of cooling the cylinders, and oil being cooled by a radiator 19 attached to front faces of the sub-frames 5.

Figure 2:
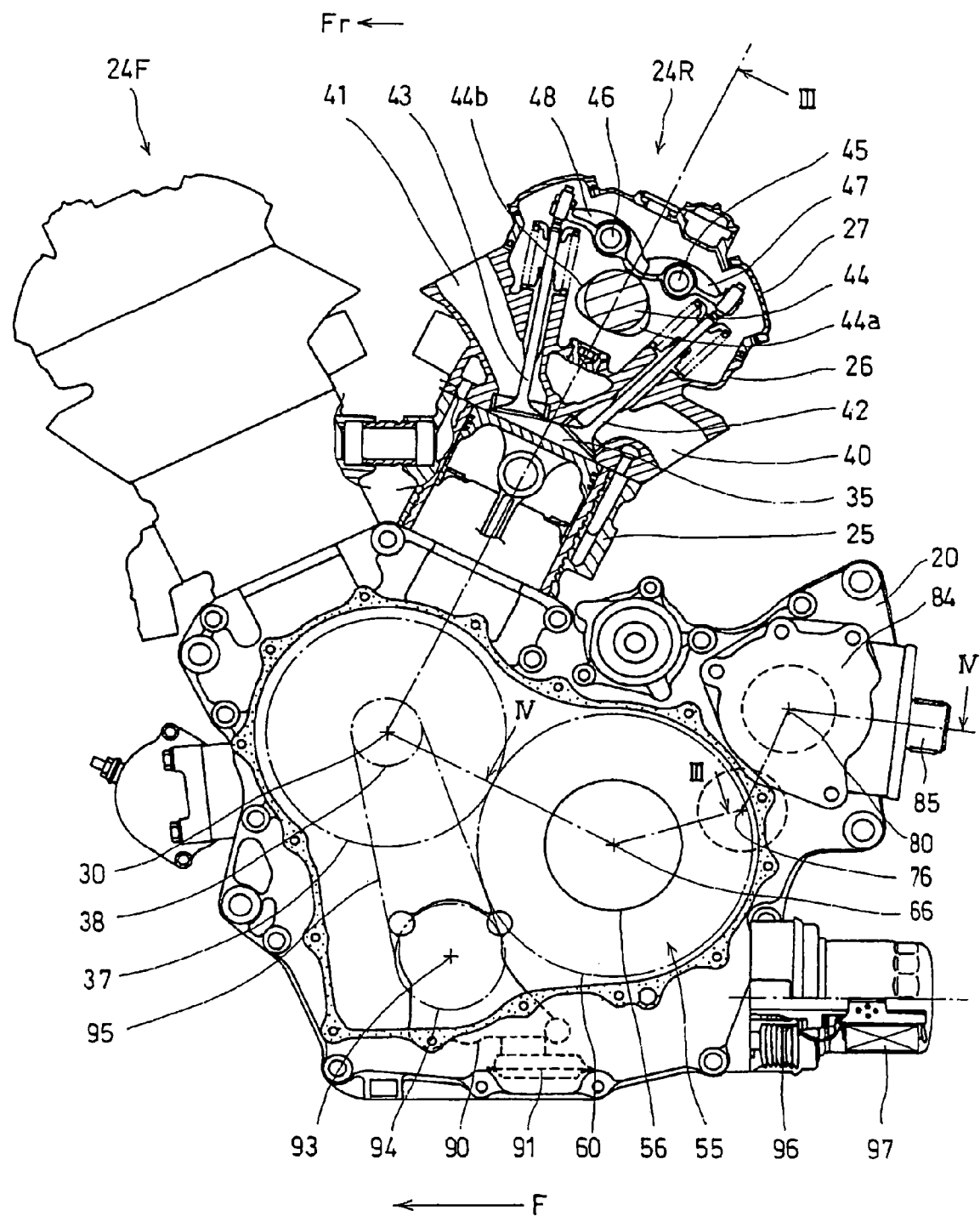
FIG. 2 is a left side view of the power unit 2 mounted on the two-wheeled motor vehicle.

FIG. 2 is a left side view of the power unit 2 mounted on the two-wheeled motor vehicle. The arrow Fr indicates the front side in the mounted state of the power unit 2 on the vehicle. The arrow Fr also represents the same direction in the other drawings. Since a front cylinder 24F and a rear cylinder 24R are of the same internal structure, only the rear cylinder 24R is shown in section. As to the crank case portion, a left crank case cover is removed and the positions of the main rotary shafts, gears and sprockets installed in the interior are shown.

Figure 3:
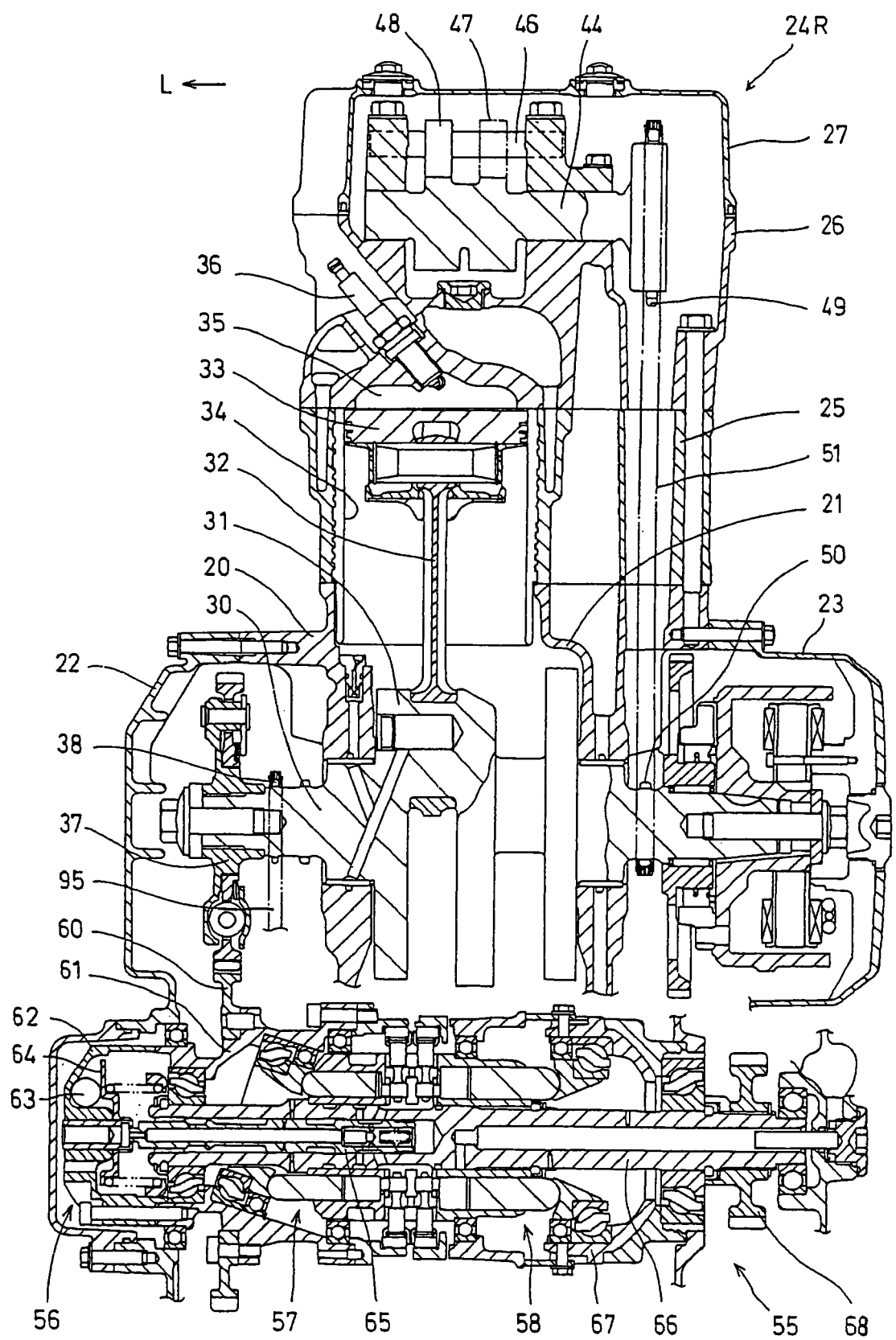
FIG. 3 is a sectional development view taken on line III—III in FIG. 2

FIG. 3 is a sectional development view taken on line III—III in FIG. 2. The arrow L indicates the left. The arrow L also indicates the left direction in the other drawings. FIG. 3 is a developed view of a section including the rear cylinder 24R, a crank shaft 30 and a hydraulic transmission 55. The rear cylinder 24R holds a piston connected to a left crank pin 31.

In FIGS. 2 and 3, the contour of the power unit 2 is mainly composed of a left crank case 20, a right crank case 21, a left crank case cover 22, a right crank case cover 23, as well as a cylinder block 25, a cylinder head 26 and a cylinder head cover 27 which are provided in each of the front and rear cylinders 24F, 24R. The following description of the cylinder portion will be based on the rear cylinder 24R.

In FIG. 3, the crank shaft 30 is rotatably supported by the left and right crank cases 20, 21. A connecting rod 32 and a piston 33 are connected to the left crank pin 31 of the crank shaft 30 with the piston 33 being slidably held within a cylinder bore 34 formed in the cylinder block 25. A combustion chamber 35 is formed in a portion of the cylinder head 26 which portion is opposed to the piston 33, and there is provided a spark plug 36 whose tip end faces the combustion chamber 35 and whose rear end is exposed to the exterior.

In FIG. 2, an intake port 40 and an exhaust port 41 are connected to the combustion chamber 35. The intake port 40 extends forwardly in the front cylinder 24F and rearwardly in the rear cylinder 24R. The exhaust port 41 in each of the cylinders extend upwardly in the space formed between both cylinders. An intake valve 42 and an exhaust valve 43 are provided in the intake port 40 and the exhaust port 41, respectively. A cam shaft 44 is disposed inside the cylinder head cover 27, and an intake rocker arm shaft 45 and an exhaust rocker arm shaft 46 are disposed above the cam shaft 44. An intake rocker arm 47 and an exhaust rocker arm 48, provided on these arm shafts, are actuated by cams 44a and 44b of the cam shaft 44 and push top portions of stems of the intake valve 42 and the exhaust valve 43 to open or close the valves. In FIG. 3, the cam shaft 44 is driven by a cam shaft drive chain 51 which is entrained on a cam shaft driven sprocket 49 mounted on an end portion of the cam shaft 44 and also entrained on a cam shaft driving sprocket 50 mounted on the crank shaft 30.

In FIGS. 2 and 3, a hydraulic transmission 55 is disposed behind the crank shaft 30. This transmission is a starting clutch integrated type hydrostatic continuously variable transmission, which includes a combination of a centrifugal governor clutch 56 and a swash plate hydraulic pump 58. A crank shaft output gear 37, mounted on a left end portion of the crank shaft 30, is in mesh with a transmission input gear 60 which is integrally combined with a casing 61 of the swash plate hydraulic pump 57.

A casing 62 of the centrifugal governor clutch 56 is integrally connected to a casing 61 of the swash plate hydraulic pump 57. When the rotational speed of the casing 61 of the swash plate hydraulic pump 57 becomes higher than a predetermined speed, a centrifugal weight 63 (e.g., a steel roller or a steel ball) accommodated within the casing 62 of the swash plate hydraulic pump 56 pushes a moving member 64, so that a hydraulic circuit switching rod 65 connected to the moving member 64 moves within a hydraulic transmission shaft 66 and closes an oil path for circulating discharged oil from the swash plate hydraulic pump 57 through the interior of the same pump, allowing the discharged oil to flow toward a swash plate hydraulic motor 58.

The swash plate hydraulic pump 57 and the swash plate hydraulic motor 58 are connected together at a transmission gear ratio corresponding to the state of inclination of a swash plate 67 of the swash plate hydraulic motor 58, and a shifted rotational force is taken out from a transmission output gear 68 fixed to the hydraulic transmission shaft 66 which is integral with an output portion of the swash plate hydraulic motor 58. As to a swash plate drive mechanism 70 for changing the angle of inclination of the swash plate 67 of the swash plate hydraulic motor 58, a description will be given later.

Figure 4:
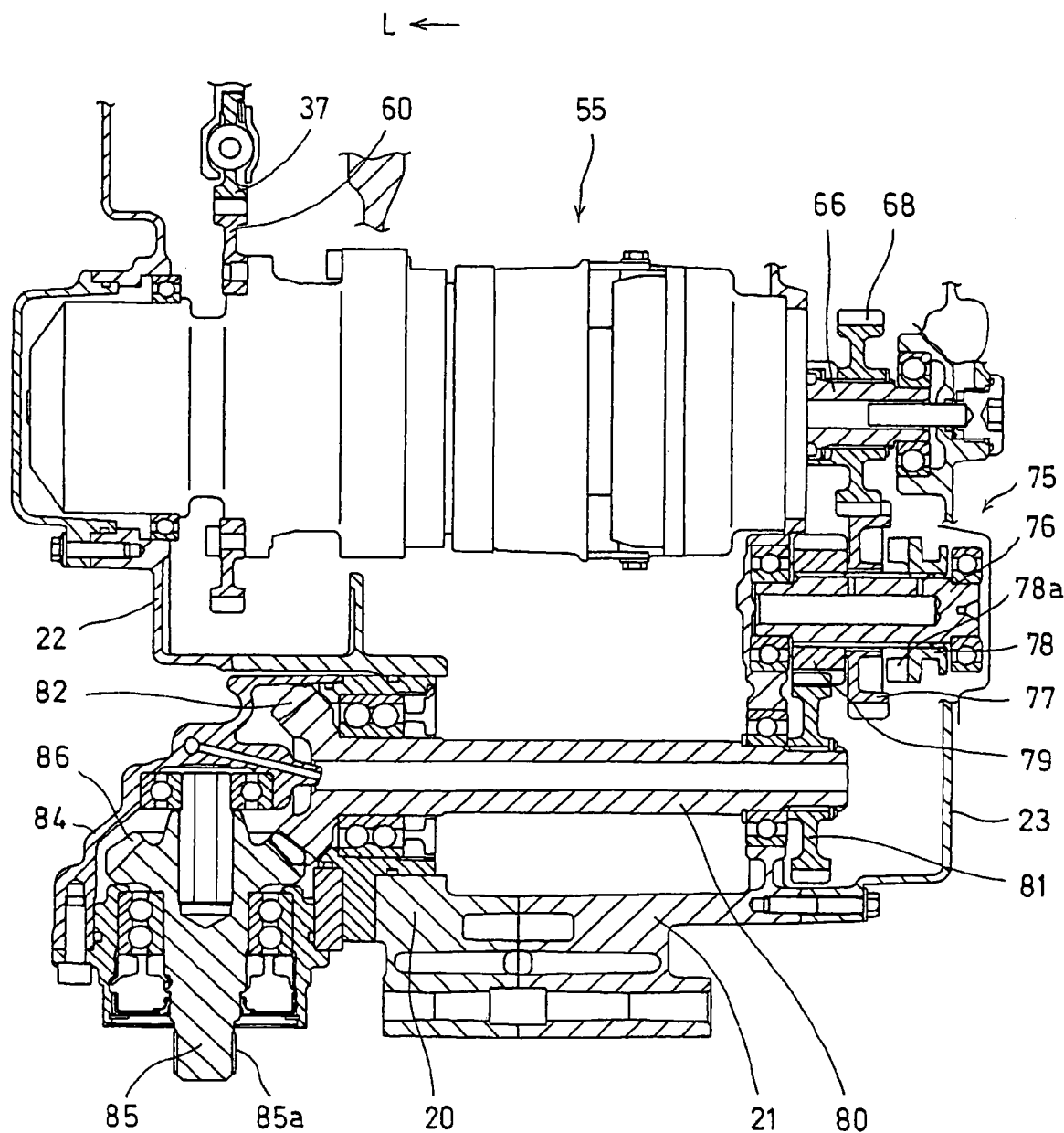
FIG. 4 is a sectional view taken on line IV—IV in FIG. 2.

FIG. 4 is a sectional view taken on line IV—IV in FIG. 2, showing a power transfer path extending from the hydraulic transmission shaft 66 to a connection shaft 85. A clutch shaft 76 is supported by the right crank case 21 and the right crank case cover 23 rotatably through a ball bearing and in parallel with the hydraulic transmission shaft 66. Likewise, an output shaft 80 is supported by the left crank case 20 and the right crank case 21 rotatably through a ball bearing and in parallel with the clutch shaft 76. Further, the connection shaft 85 is supported perpendicularly to the output shaft 80 and rotatably by a connection shaft support portion 84 which is disposed near a left end portion of the output shaft 80. The connection shaft support portion 84 is mounted outside the left crank case 20. See, FIGS. 2 and 4.

A gear 77 is loosely fitted on the clutch shaft 76 so as to be rotatable relative to the clutch shaft. The gear 77 is in mesh with the transmission output gear 68 fitted on the hydraulic transmission shaft 66. A slide member 78 having engaging teeth 78a is loosely fitted on the clutch shaft 76 axially slidably and is disposed adjacent to the gear 77. A manual clutch 75 which can intermit the transfer of power includes the clutch shaft 76, gear 77 and slide member 78. When the slide member 78 is caused to slide in the direction of the crank shaft 76 and the engaging teeth 78a are brought into engagement with an engaging portion of the gear 77, the clutch is engaged into a drive condition. When the slide member 78 is moved to disengage the engaging teeth 78a from the gear 77, the clutch is released into a neutral condition. As to a switching mechanism of the manual clutch 75, a description will be given later.

A gear 79 is fitted on the clutch shaft 76 on the side opposite to the gear 77 with respect to the slide member 78 and is adjacent to the gear 77. A gear 81 is fitted on a right end portion of the output shaft 80. The gear 81 is in mesh with the gear 79 on the clutch shaft 76. A bevel gear 82 is integrally formed on the opposite end of the output shaft 80. A bevel gear 86 is integrally formed on a front end of the communication shaft 85 and is in mesh with the bevel gear 82 on the output shaft 80. A rear end of the connection shaft 85 is splined as indicated at 85a so that a rear wheel driving shaft (not shown) can be connected to the rear end of the connection shaft 85. With the shafts and gears, a rotational output of the hydraulic transmission 55 is transferred to the rear wheel driving shaft.

Figure 5:
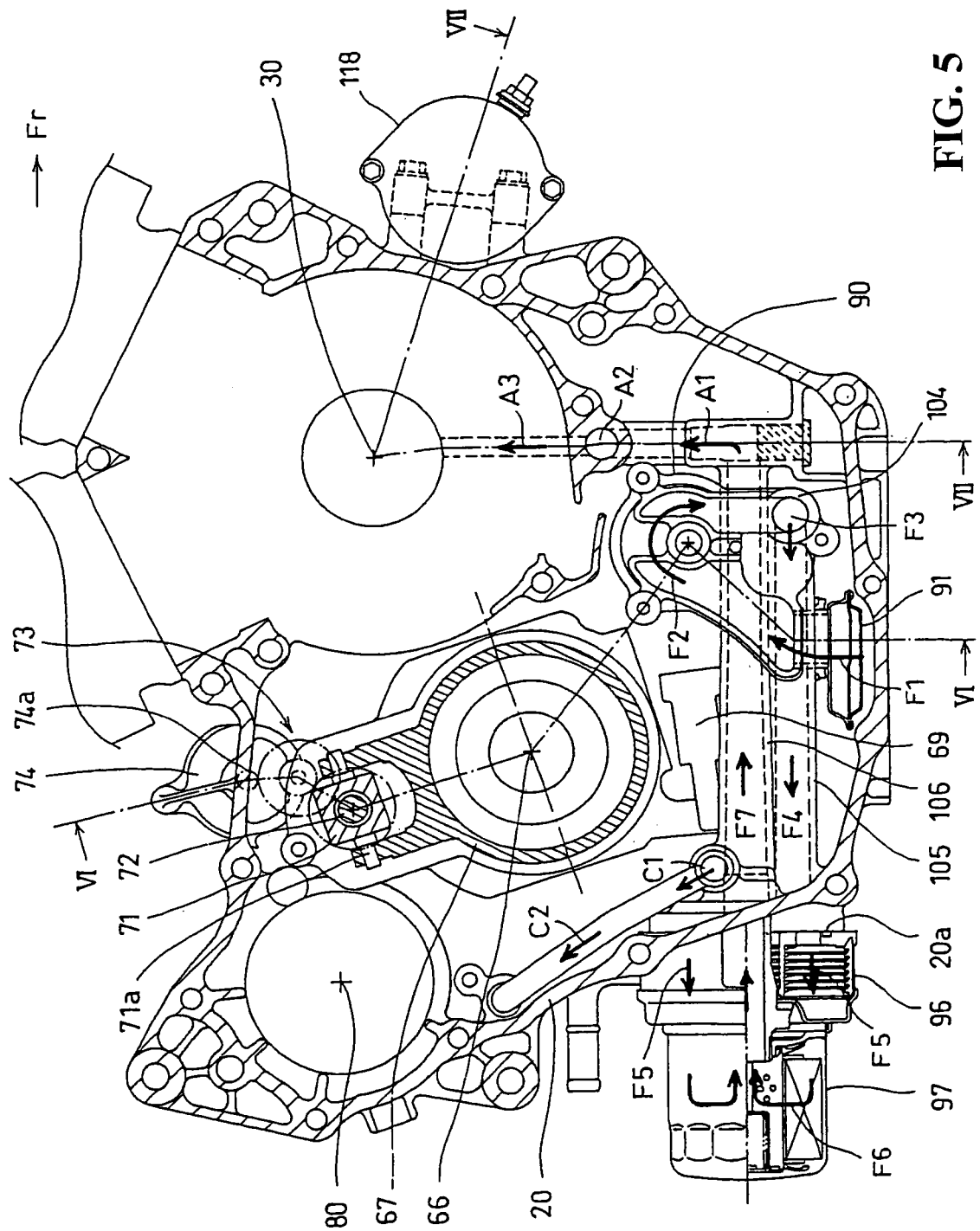
FIG. 5 is a sectional view showing the interior of a left crank case 20 as seen from the right side.

FIG. 5 is a sectional view of the interior of the crank case 20 as seen from the right side. The positions of the crank shaft 30, the hydraulic transmission shaft 66 and the output shaft 80, as well as a section of the swash plate 67 of the hydraulic motor 58, are shown in FIG. 5. In FIG. 5, an oil pump 90 and an oil strainer 91 connected thereto are disposed in a lower portion of the left crank case 20. An oil cooler mounting surface 20a is formed on a rear surface of the left crank case 20, and an oil cooler 96 and an oil filter 97 are attached to the oil cooler mounting surface 20a. An oil pump discharge pipe 104 for the supply of discharged oil from the oil pump 90 to the oil cooler 96, as well as an oil cooler connection pipe 105, are provided. Further, an oil filter outlet pipe 106 for the delivery of oil is provided contiguously to an outlet of the oil filter 97.

Figure 6:
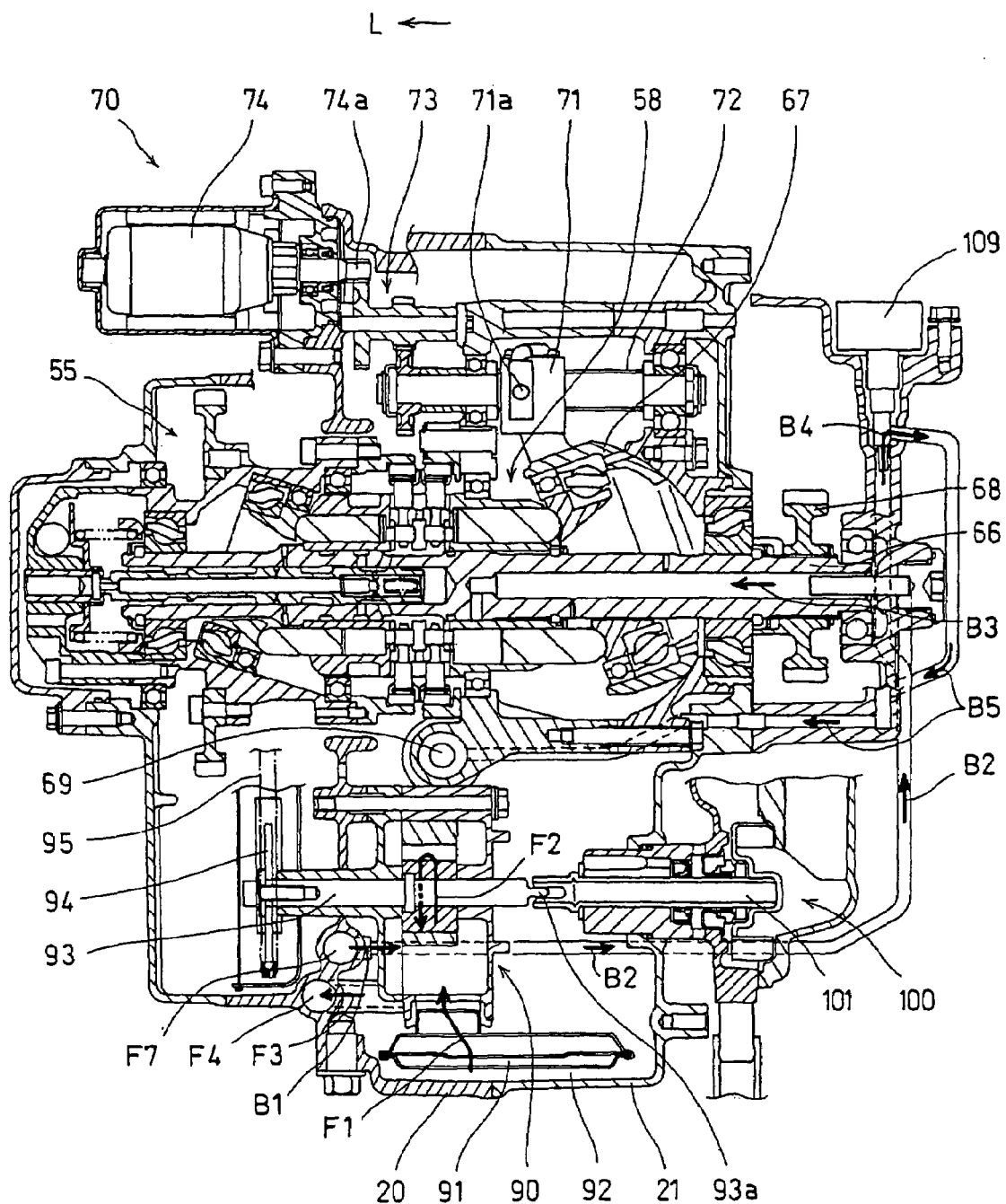
FIG. 6 is a sectional view taken on line VI—VI in FIG. 5.

FIG. 6 is a sectional view taken on line VI—VI in FIG. 5. The hydraulic transmission 55, a swash plate drive mechanism 70 for changing the angle of inclination of the swash plate 67 of the hydraulic motor 58 in the transmission 55, the oil pump 90, and a water pump 100, are shown in FIG. 6. A swash plate drive motor 74 in the switch plate drive mechanism 70 is provided on the left side of an upper portion of the left crank case.

In FIGS. 5 and 6, a moving piece 71 in the swash plate drive mechanism 70 is connected to the swash plate 67 of the hydraulic motor 58 through a pin 71a. The moving piece 71 is threadedly engaged with a rotary shaft 72, which in turn is engaged with an output pinion 74a of the swash plate drive motor 74 through a group of reduction gears 73. The swash plate drive mechanism 70 is actuated with the rotation of the swash plate drive motor 74, whereby the swash plate 67 of the hydraulic motor 58 tilts at a required angle and the hydraulic transmission is set at a transmission gear ratio corresponding to the inclination angle. A hydraulic motor lock-up mechanism 69 is disposed below the hydraulic motor 58.

In FIG. 6, the oil pump 90 is disposed in the lower portion of the left crank case 20. The oil pump 90, with the oil strainer 91 connected to a lower portion thereof, sucks up oil from an oil pan 92 formed in the lower portion of the crank case, and supplies the oil to required portions. An oil pump shaft 93 extends through the center of the oil pump 90 and a pump driven sprocket 94 is mounted on an end portion of the oil pump shaft 93. The oil pump 90 is rotated by an oil pump drive chain 95 which is stretched between and entrained on the pump driven sprocket 94 and an oil pump driving sprocket 38, see FIGS. 2 and 3, mounted on the crank shaft 30. A solenoid valve 109 is disposed above the right end of the hydraulic motor shaft 66. The solenoid valve 109 is for intermitting the supply of oil to the hydraulic motor lock-up mechanism 69.

The water pump 100 is disposed in a lower portion of the right crank case 21 at a position adjacent to the oil pump 90. A rotary shaft 101 of the water pump 100 is coaxial with the oil pump shaft 93 and both shafts are connected together at respective opposed ends through a connecting portion 93a of the oil pump 93 so as to rotate in interlock with each other. Cooling water discharged from the water pump 100 is fed to the cylinder blocks 25 and cylinder heads 26 of the front and rear cylinders to cool them. At the same time, a portion of the cooling water is fed to the oil cooler 96 to cool oil for lubrication. The cooling water whose temperature has become high passes through the radiator 19, see FIG. 1, and is returned to the water pump 100.

Figure 7:
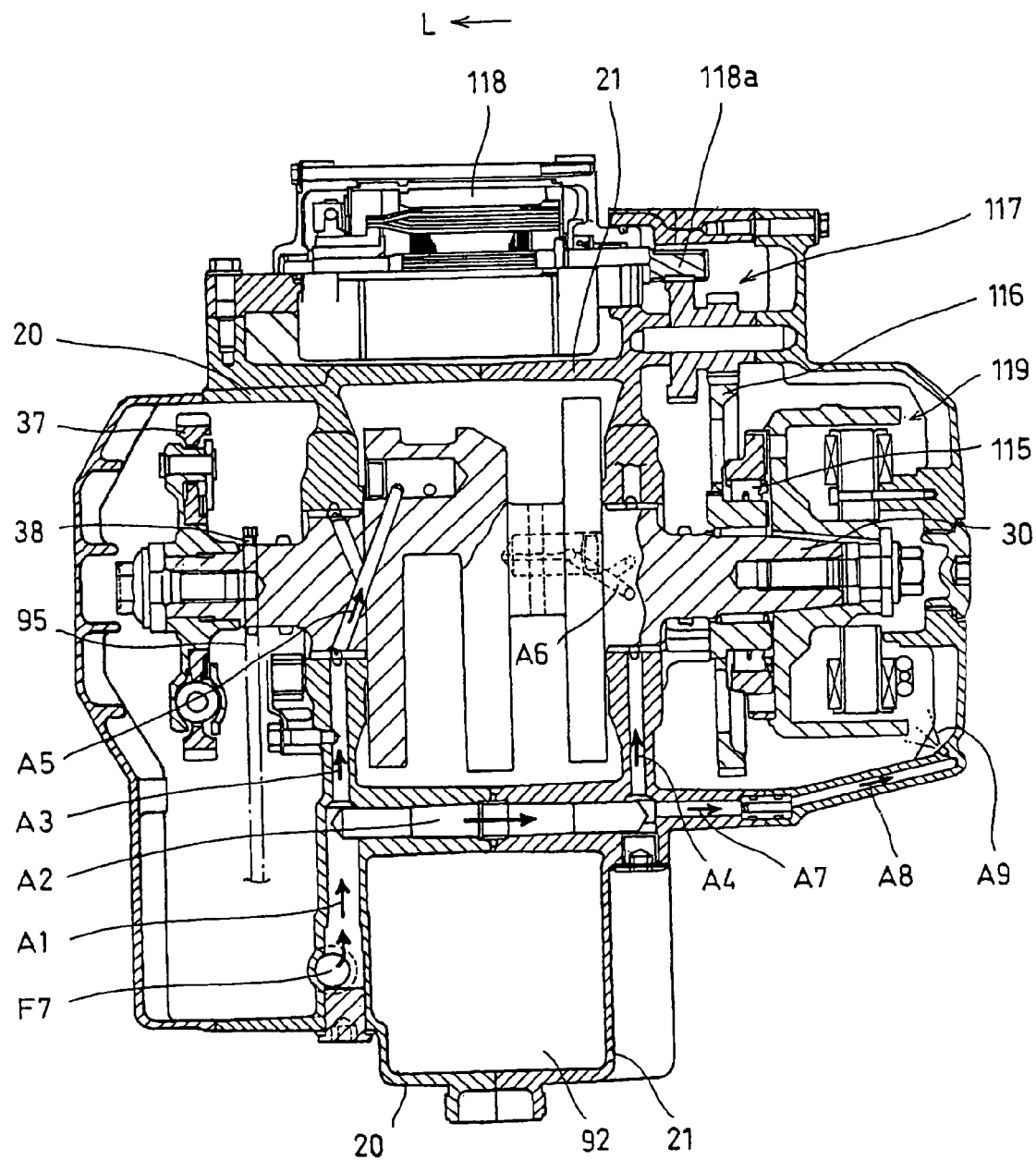
FIG. 7 is a sectional view taken on line VII—VII in FIG. 5.

FIG. 7 is a sectional view taken on line VII—VII in FIG. 5. A starter motor 118 is attached to front portions of the crank cases 20 and 21. A gear 116 is mounted on the crank shaft 30 through a one-way clutch 115. The gear 116 is in mesh with an output pinion 118a of the starter motor 118 through a group of reduction gears 117. With the starter motor 118, the crank shaft 30 is rotated at the time of start-up of the internal combustion engine. An AC generator 119 is mounted on an end portion of the crank shaft 30 and generates electric power with rotation of the crank shaft 30.

Figure 8:
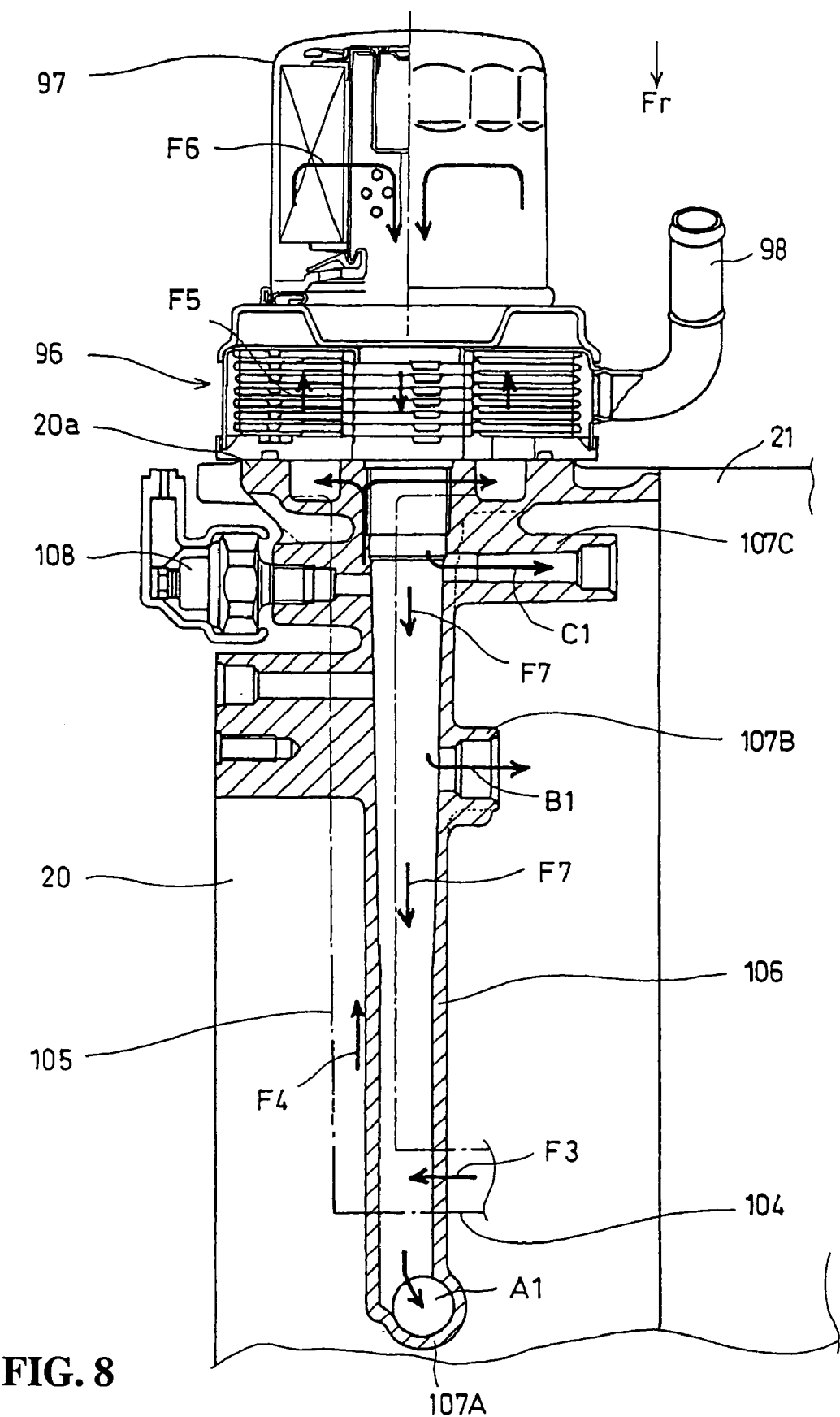
FIG. 8 is a sectional view of a lower portion of the left crank case 20 as seen from below.

FIG. 8 shows a lower section of the left crank case 20 as seen from below. A mounting surface 20a for the oil cooler 96 is formed at a rear end of the left crank case 20 and the oil cooler 96 is attached at one end face thereof to the mounting surface 20a. An oil filter 97 is attached to an opposite end face of the oil cooler 96. A cooling water inlet 98 connected to the water pump 100 is formed in the oil cooler 96. The oil pump discharge pipe 104 and the oil cooler connection pipe 105, connected to the oil pump discharge pipe 104 and extending toward the oil cooler 96, are indicated with a dot-dash line. The oil filter outlet pipe 106 is connected to and passes through the central part of the oil filter 97 and extends forward for the delivery of oil. Branch portions 107A, 107B and 107C extending toward portions to be lubricated are formed sideways of the oil filter outlet pipe 106. Further, an oil pressure sensor 108 for detecting an internal oil pressure of the oil filter outlet pipe 106 is provided.

Figure 9:
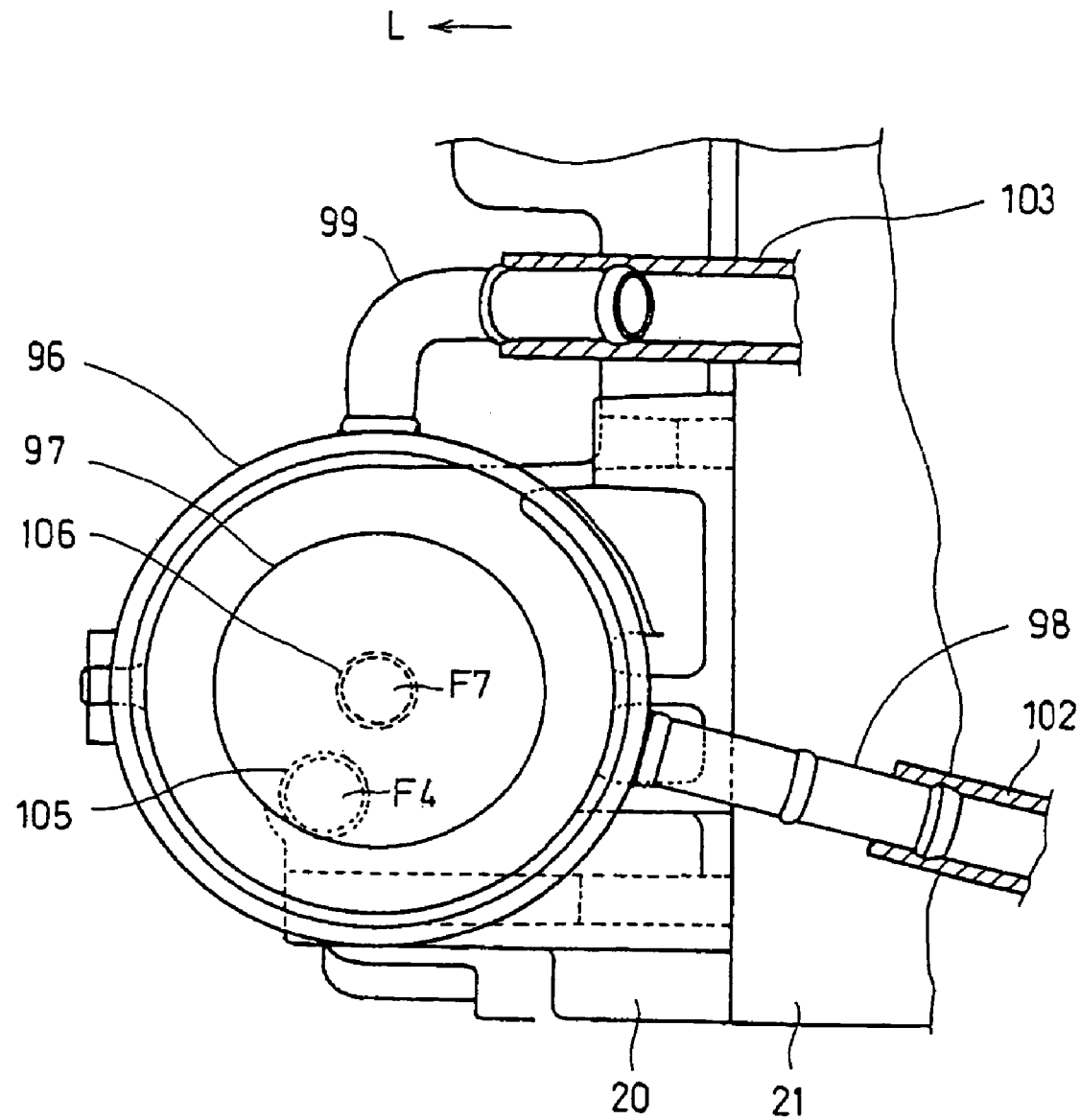
FIG. 9 is a rear view of the left crank case 20.

FIG. 9 is a rear view of the left crank case 20. A rear surface of the oil cooler 96 and that of the oil filter 97 are shown in the FIG. 9. A cooling water inlet 98 and a cooling water outlet 99 are shown in connection with the oil cooler 96. The cooling water inlet 98 is connected to the water pump 100, see FIG. 6, through a cooling water supply hose 102, while the cooling water outlet 99 is connected to the radiator 19, see FIG. 1, through a cooling water return hose 103.

Figure 10:
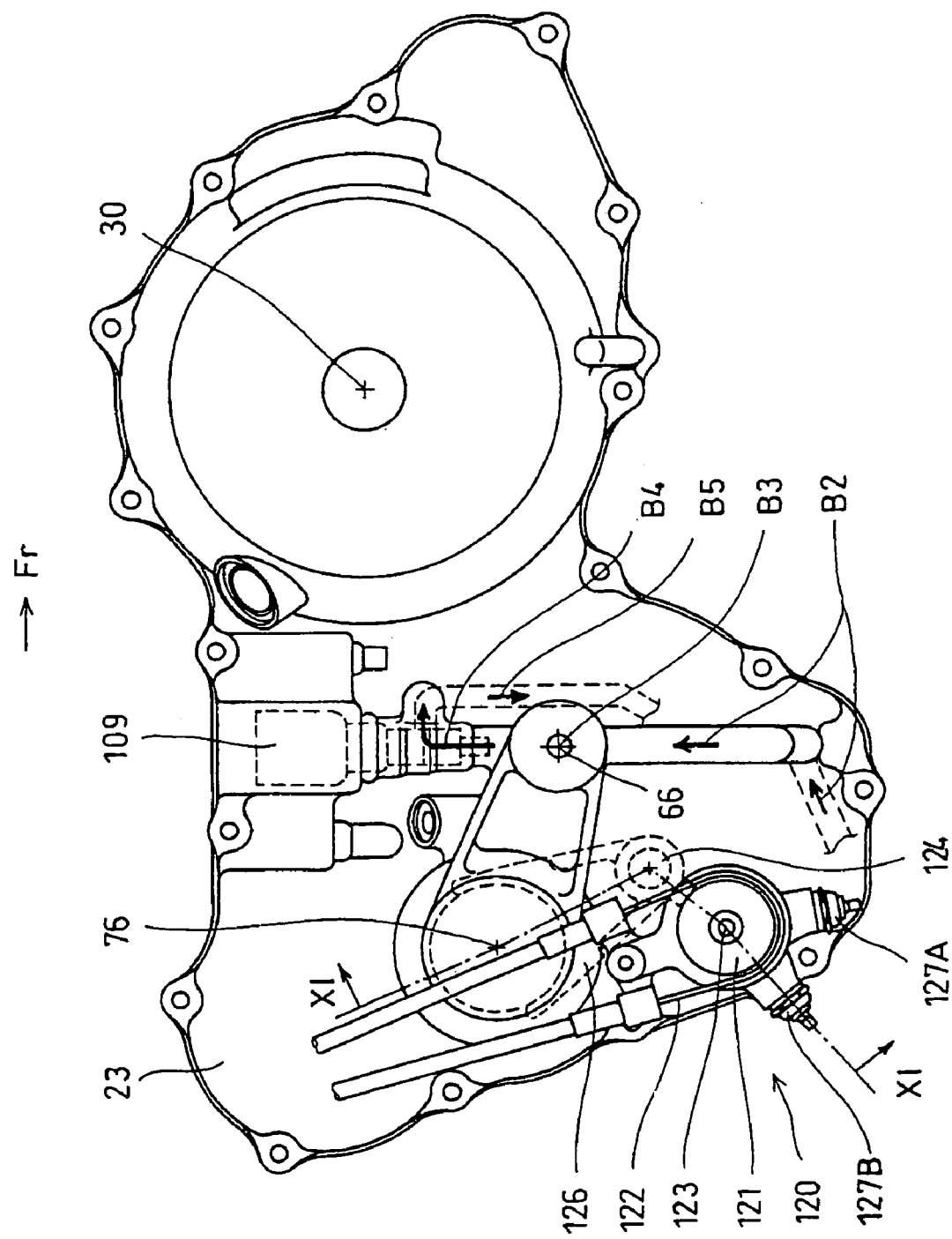
FIG. 10 is a left side view of a left crank case cover 22.

FIG. 10 is a right side view of the right crank case cover 23, which is attached to the right side of the right crank case 21. A manual clutch switching device 120 for switching between Drive and Neutral of the manual clutch 75 is provided in the right crank case cover 23. An operating wire 122 entrained on a rotating wheel 121 of the manual clutch switching device 120 is connected to an operating device (not shown) provided in the steering handle 9 of the vehicle 1. The operating device is manually operated by a rider. The operating device may be disposed in the lower portion of the vehicle and be operated by a foot of the rider, or may be operated by a motor.

Figure 11:
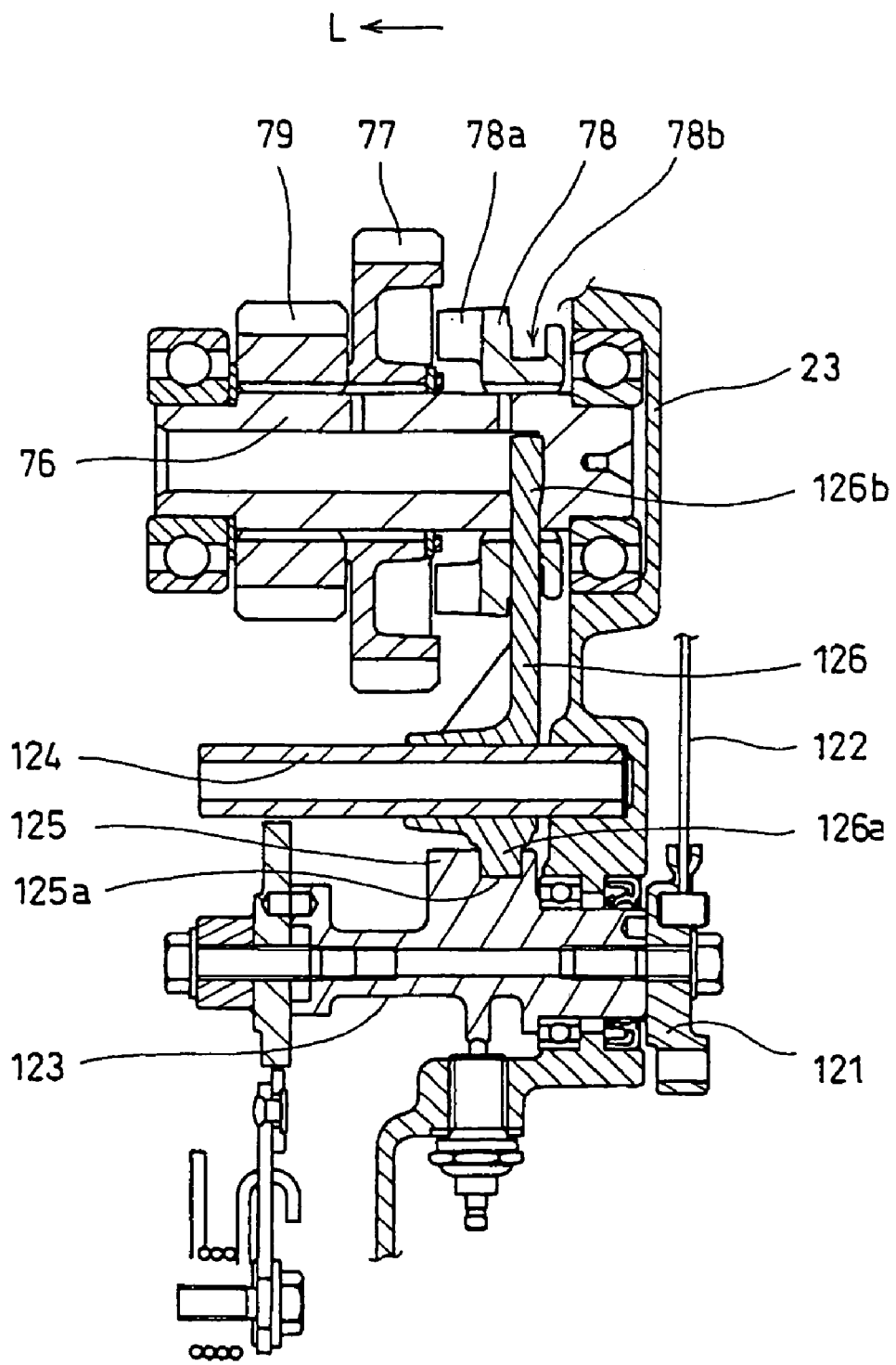
FIG. 11 is a sectional view taken on line XI—XI in FIG. 10.

FIG. 11 is a sectional view taken on line XI—XI in FIG. 10. A drum shaft 123 is connected to the center of the rotating wheel 121, a shift fork support shaft 124 and the clutch shaft 76 are disposed inside the right crank case cover 23 and in parallel with one another. The drum shaft 123 is supported rotatably by the right crank case 21 and the right crank case cover 23. A drum 125 having a spiral groove 125a is formed as a large-diameter portion of the drum shaft 123. The shift fork support shaft 124 is supported by the right crank case 21 and the right crank case cover 23, and a shift fork 126 is loosely fitted on the shift fork support shaft 124 so as to be axially slidable. A projecting pin 126a of the shift fork 126 is engaged with the spiral groove 125a of the drum 125, while a bifurcated portion 126b formed at a tip end of the shift fork is engaged with a peripheral groove 78b formed in the slide member 78 of the manual clutch.

When the rider of the vehicle operates the operating device (not shown) by hand or foot to turn the rotating wheel 121 through the operating wire 122, see FIG. 10, the drum 125 turns accordingly and the shift fork 126, which is engaged with the spiral groove 125a of the drum through the projecting pin 126a, slides along the shift fork support shaft 124, so that the slide member 78 of the manual clutch 75 engaged with the bifurcated portion 126b of the shift fork 126 moves along the clutch shaft 76 and the engaging teeth 78a of the slide member 78 are connected to or disconnected from the gear 77, whereby it is possible to make or break the transfer of power in the transmission. In FIG. 10, a drive sensor 127A and a neutral sensor 127B are provided.

FIGS. 12 to 17 illustrate the oil pump 90. As shown in FIGS. 5 and 6, the oil pump 90 is installed integrally with the oil strainer 91 at a front position, i.e., below the crank shaft 30, in the lower portion of the left crank case 20. As shown in FIG. 6, the oil strainer 91 is disposed in a central lower portion of the crank case, i.e., within the oil pan 92 which straddles the left and right crank cases 20, 21.

Figure 12:
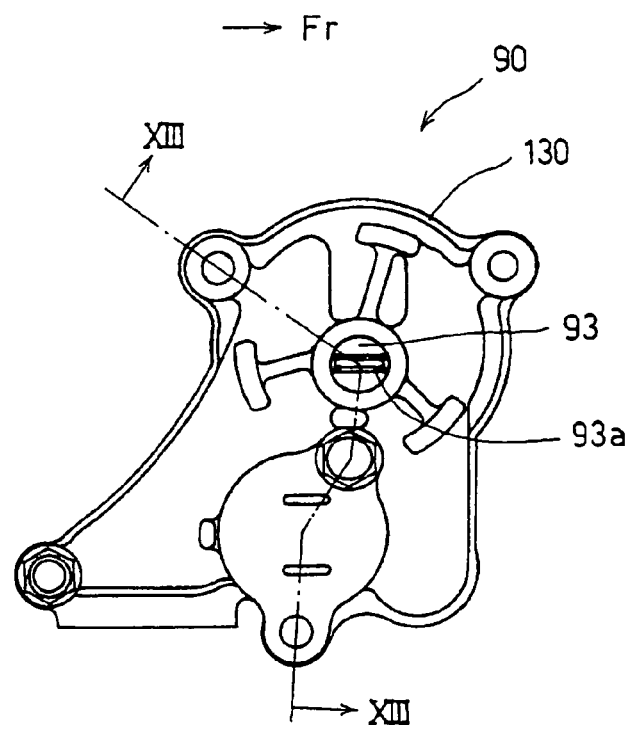
FIG. 12 is a right side view of an oil pump 90.
Figure 13:
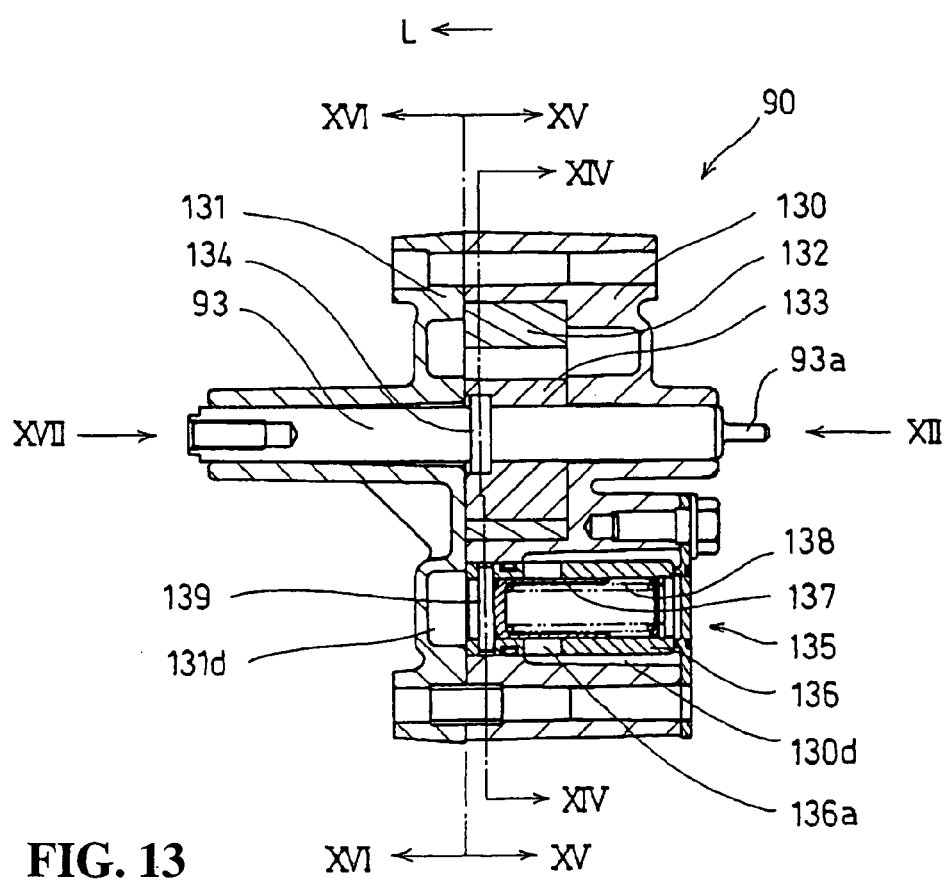
FIG. 13 is a sectional view taken on line XIII—XIII in FIG. 12.
Figure 14:
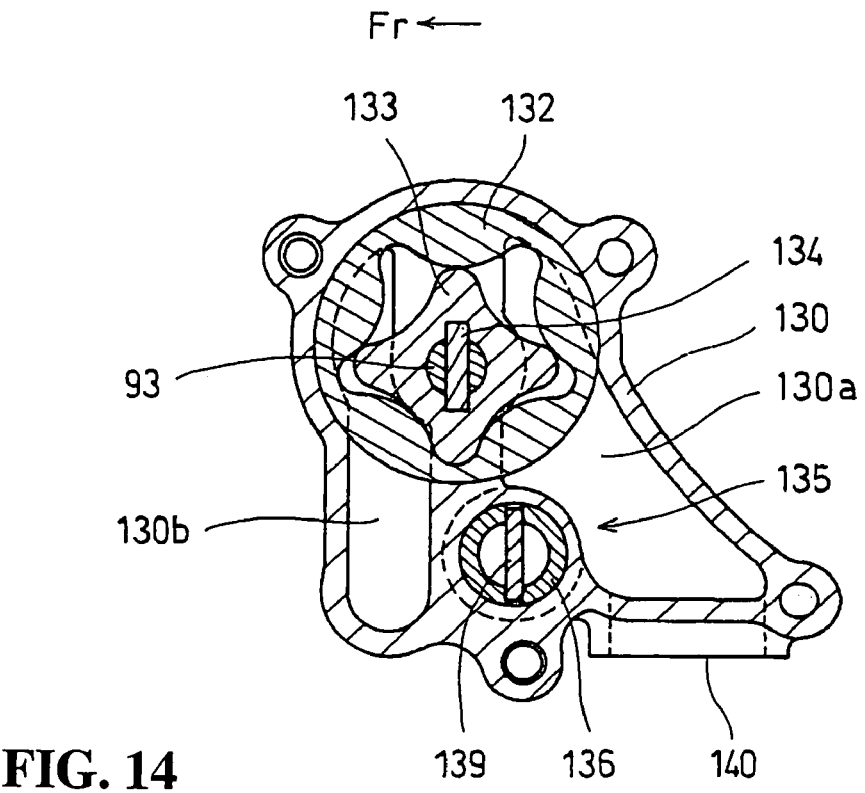
FIG. 14 is a sectional view taken on line XIV—XIV in FIG. 13.

FIG. 12 is a right side view of the oil pump 90, a view as seen in the direction of arrow XII in FIG. 13. The contour of the oil pump 90 includes an oil pump body 130 and an oil pump cover 131, and an outer rotor 132 and an inner rotor 133 are mounted in a mutually engaged state within the oil pump body 130, as shown in FIGS. 13 and 14.

The oil pump shaft 93 is rotatably mounted through the oil pump body 130 and the oil pump cover 131, and the inner rotor 133 is fixed to the oil pump shaft 93 through an engaging pin 134. The connecting portion 93a for connection to the water pump shaft 101 is formed at the right end of the oil pump shaft 93, see FIGS. 6 and 13, whereby the water pump 100 is interlocked with the oil pump 90.

A relief valve 135 is mounted to the oil pump body 130. As shown in FIG. 13, the relief valve 135 includes a cylindrical portion 136 provided sideways with an outflow hole 136a, a bottomed cylinder-like valve body 137 adapted to slide within the cylindrical portion 136, a coiled spring 138 mounted inside the valve body 137 to push the valve body toward a closing side, and a stopper pin 139 provided at one end of the cylindrical portion 136.

Figure 15:
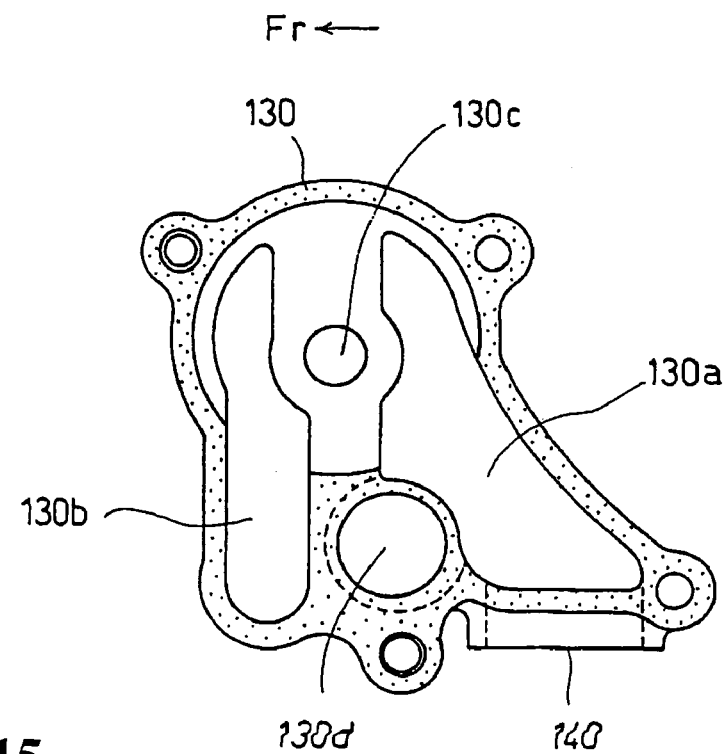
FIG. 15 shows an oil pump body 130 as seen in the direction of arrow XV in FIG. 13.

FIG. 15 illustrates the oil pump body 130 as seen in the direction of arrow XV in FIG. 13. An oil inlet port 140 is formed in a lower portion on one side of the oil pump body and an inflow oil path 130a extending obliquely upwardly is formed contiguously to the oil inlet port 140. On the opposite side is formed an outflow oil path 130b. An oil pump shaft insertion hole 130c is formed in an upper position, while a relief valve receiving hole 130d is formed in a lower position. A large-diameter portion is formed in the relief valve receiving portion 130d, as indicated with a broken line in FIG. 15 and as shown in FIG. 13.

Figure 16:
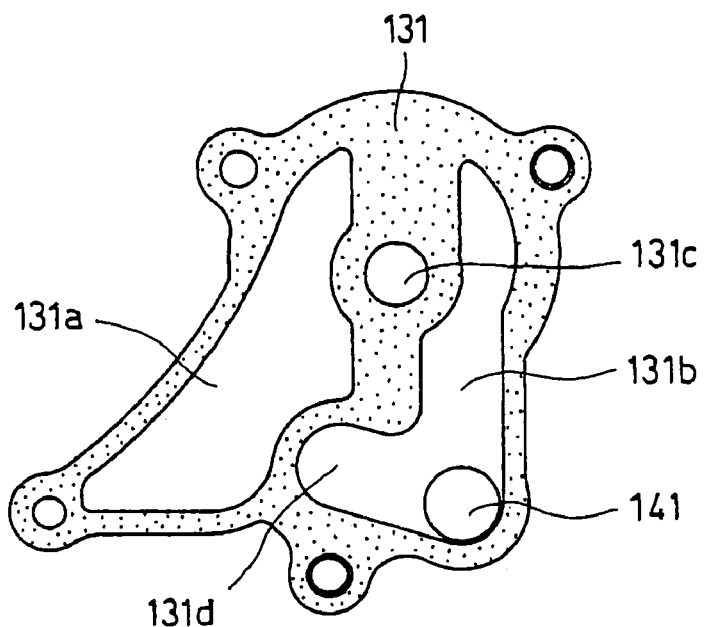
FIG. 16 shows an oil pump cover 131 as seen in the direction of arrow XVI in FIG. 13.

FIG. 16 illustrates the oil pump cover 131 as seen in the direction of arrow XVI in FIG. 13. An inflow oil path 131a is formed on one side, while an outflow oil path 131b is formed on the opposite side. An oil pump shaft insertion hole 131 is formed in an upper portion. An oil discharge port 141 is formed in a lower end of the outflow oil path 131b. The inflow oil paths, outflow oil paths and oil pump shaft insertion holes of the oil bump body 130 and the oil pump cover 131 lie respectively at mutually opposed positions. An outflow oil path extension 131d contiguous to the outflow oil path 131 and extending to a position opposed to the relief valve 135 is provided.

Figure 17:
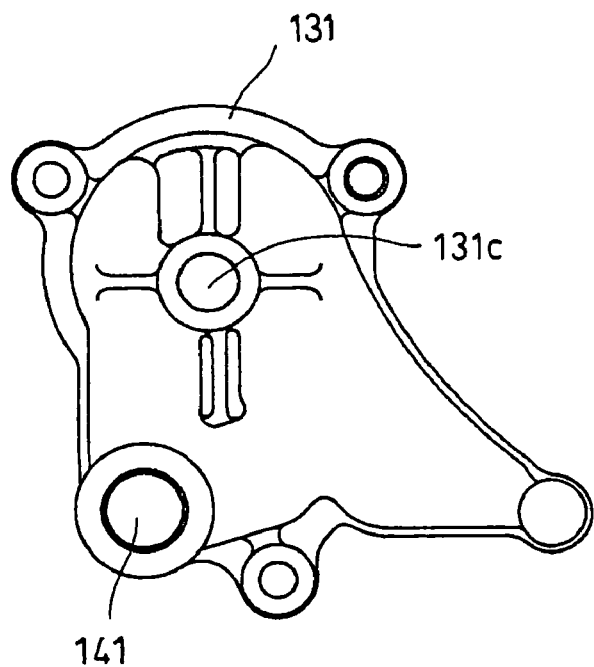
FIG. 17 shows the oil pump cover 131 as seen in the direction of arrow XVII in FIG. 13.

FIG. 17 illustrates the oil pump cover 131 as seen in the direction of arrow XVII in FIG. 13. The oil pump shaft insertion hole 131c and the oil discharge port 141 are shown.

In the oil pump described above, when the oil pump shaft 93 is rotated, the inner rotor 133 rotates through the engaging pin 134 and the outer rotor 132 also rotates together with the inner rotor by the engagement of teeth, whereby the oil sucked in from the oil inlet port 140 is discharged from the oil discharge port 141 through the inflow oil paths 130a, 131a and the outflow oil paths 130b, 131b.

When the oil pressure on the oil discharge side becomes excessive, the pressure of the outflow oil paths 130b and 131b increases and the valve body 137 of the relief valve 135 is pushed by the oil pressure which is transmitted thereto through the outflow oil path extension 131d, see FIGS. 16 and 13, in the oil pump cover 131, so that the outflow hole 136a of the relief valve 135 opens and surplus oil passes through the large-diameter portion, the portion indicated by a broken line in FIGS. 14 and 15, of the relief valve receiving hole 130d in the oil pump body 130 and returns to the inflow oil path 130a, whereby an excessive increase of oil pressure on the discharge side is prevented.

A large number of oil paths are formed in the power unit 2 to feed oil discharged from the oil pump 90 to various portions to be lubricated. These oil paths are roughly classified into the following four systems of oil paths:

a supply system oil path F, from the oil pan 92 to the oil filter outlet pipe 106.

a crank shaft communicating oil path A, branching from the supply system oil path F and extending toward the crank shaft 30.

a transmission communicating oil path B, branching from the supply system oil path F and extending toward the hydraulic transmission 55.

an output shaft communicating oil path C, branching from the supply system oil path F and extending toward the output shaft 80.

The oil paths are represented by reference marks and arrows which indicate oil flowing directions in FIGS. 5 to 10. In each system, oil paths are continuous in numerical order. The oil paths will be described below in the order of the reference marks. The numbers of main drawings which describe the oil paths of the various systems will be referred to at the beginning of respective explanations, but there also are drawings describing the oil paths, which drawings will be parenthesized below.

The supply system oil path F, which is mainly illustrated in FIGS. 5 and 8, is made up of an oil pump suction oil path F1, see FIG. 6, extending from the oil pan 92 to the oil pump 90 through the oil strainer 91, an intra-oil pump 90 oil path F2, see FIG. 6, an oil pump discharge pipe oil path F3, see FIG. 6, contiguous to the oil pump discharge port 141, a connection pipe oil path F4, see FIGS. 6 and 9, extending from the oil pump 90 to the oil cooler 96, an intra-oil cooler oil path F5, an intra-oil filter oil path F6, and an oil filter outlet pipe oil path F7, see FIGS. 6, 7 and 9. Oil is delivered through the oil paths of this system.

The crank shaft communicating oil path A, which is mainly shown in FIGS. 5 and 7, is made up of an upwardly communicating oil path A1, see FIG. 8, contiguous to an end of the oil filter outlet pipe oil path F7 and extending upwardly, an oil gallery oil path A2, an intra-left crank case oil path A3 contiguous to the upwardly communicating oil path A1, an intra-right crank case oil path A4 contiguous to the oil gallery oil path A2, an intra-crank shaft left oil path A5 contiguous to the intra-left crank case oil path A3, an intra-crank shaft right oil path A6 contiguous to the intra-right crank case oil path A4, an intra-right crank case communicating oil path A7 contiguous to the oil gallery A2, an intra-right crank case cover oil path A8, and an oil injection orifice A9 contiguous to the intra-right crank case cover oil path A8 and injecting oil to the gear on the right end portion of the crank shaft, etc. Oil is fed toward the crank shaft through the oil paths of this system.

The transmission communicating oil path B, which is mainly shown in FIGS. 6 and 10, is made up of a transmission communicating branch oil path B1, see FIG. 8, which constitutes a branch portion from the oil filter outlet pipe oil path F7 toward the hydraulic transmission at a side portion of the oil filter outlet pipe, a transmission communicating oil path B2 contiguous to the transmission communicating branch oil path B1, an intra-hydraulic transmission shaft oil path B3 contiguous to the transmission communicating oil path B2 and supplying oil to the slide portion of the hydraulic transmission through fine holes formed around the hydraulic motor shaft 66, an intra-solenoid valve oil path B4 contiguous to an end portion of the transmission communicating oil path, and an oil path B5 for lubricating the hydraulic motor lock-up mechanism. Oil is fed towards the transmission through the oil paths of this system.

The output shaft communicating oil path C, which is mainly shown in FIGS. 5 and 8, is made up of an output shaft communicating branch oil path C1 formed sideways of the oil filter outlet pipe and constituting a branch portion from the oil filter outlet pipe oil path F7 towards the output shaft and an output shaft communicating oil path C2 contiguous to the output shaft communicating branch oil path C1 and extending towards a bearing portion of the output shaft 80. Oil is fed toward the output shaft through the oil paths of this system.

As described above, since the supply system oil path F, the crank shaft communicating oil path A branched from the supply system oil path F, the transmission communicating oil path B and the output shaft communicating oil path C are provided, it is possible to lubricate various rotational bearing portions and slide portions.

In the first embodiment described above, since the water pump 100 and the oil cooler 96 are disposed below the crank shaft 30 and the oil cooler 96 is disposed on the rear surface of the power unit 2 in the vehicle advancing direction and below the output shaft 80, the oil cooler 96 can be disposed by utilizing a dead space and the water pump 100 can be disposed closer to the oil cooler 96, whereby it becomes possible to shorten the cooling water passage and simplify the structure.

The crank case includes the left crank case 20 and the right crank case 21 with the oil pump 90 and the oil cooler 96 being disposed in the left crank case 20, so that the oil passage can be disposed mainly in the left crank case 20 and the water pump 100 can be disposed by effectively utilizing the resulting dead space in the right crank case 21.

Since the oil cooler 96 is spaced away from the cylinders, it is difficult to be influenced by the heat generated from the internal combustion engine and it is possible to prevent deterioration of the cooling function of the oil cooler 96.

Since the transmission output shaft 80 is disposed at a position higher than the hydraulic transmission shaft 66, corresponding to the transmission input shaft described in claim 3, it is possible to shorten the overall length of the power unit 2.

Since the rotary shaft of the oil pump 90 and that of the water pump 100 are disposed coaxially and interlocked with each other, the use of a single drive means suffices as a common means and the structure of the power unit is simplified.

The water pump 100 is disposed on the output gear side of the hydraulic transmission 55, i.e., in the right crank case 21. Since the transmission output gear 68 in the hydraulic transmission 55 is smaller in diameter than the transmission input gear 60 in the hydraulic transmission 55, the hydraulic transmission shaft 66 and the water pump shaft 101 can be approximated to each other and the power unit can be made compact.

Since the oil pump 90 can be constructed as an assembly provided with the relief valve 135 and the oil strainer 91 separately from the case of the power unit, the power unit assembling work efficiency is improved.

The relieve valve of the oil pump is provided so as to be move axially of the oil pump and open. Since the height of the relief valve can be made smaller than in the case where the relief valve is disposed so as to move vertically of the power unit and open, the power unit is compact.

Since the water pump is disposed in proximity to the oil cooler, it is possible to shorten the cooling water passage and make the power unit compact.

Figure 18:
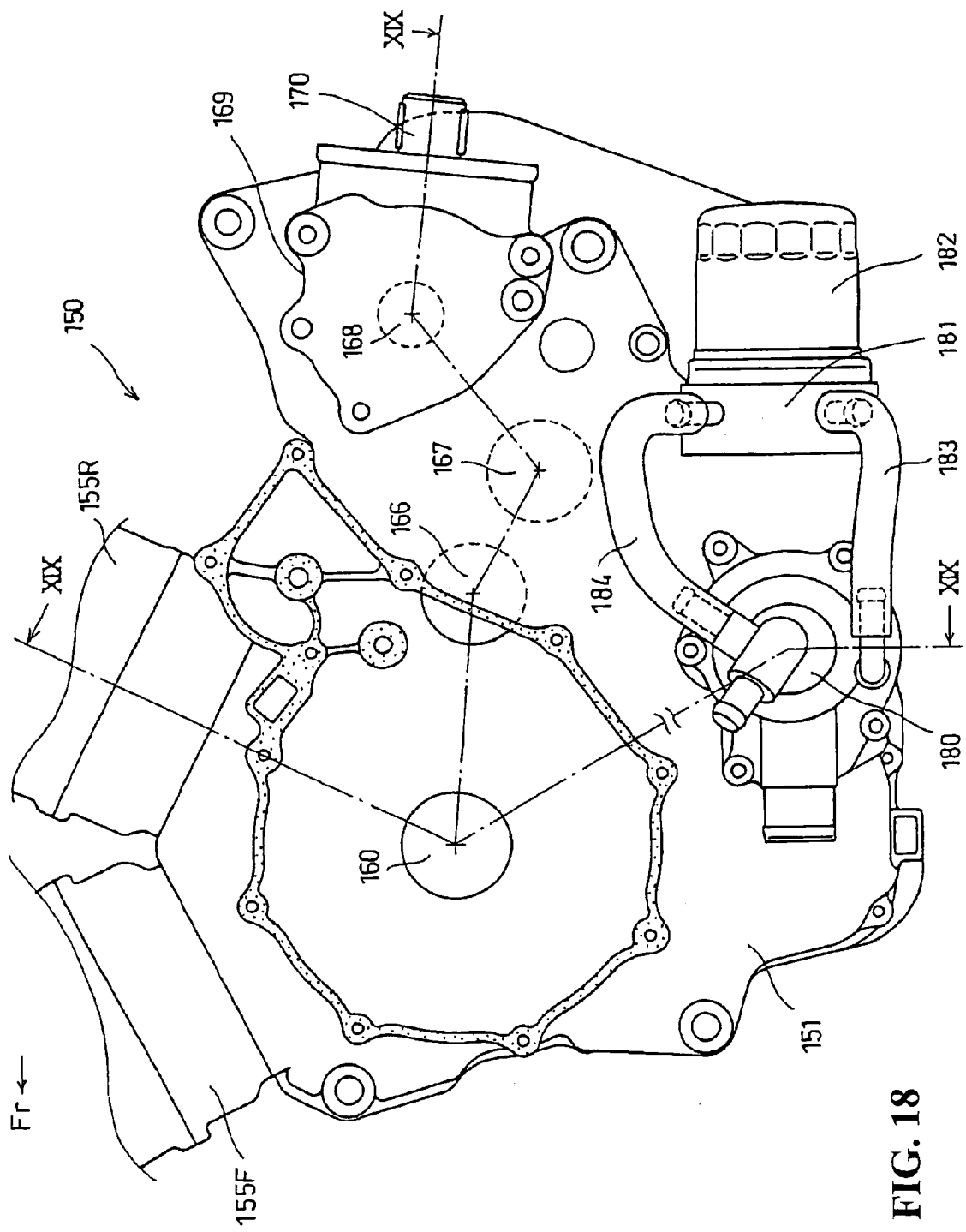
FIG. 18 is a side view of a power unit 150 according to a second embodiment of the present invention.

A second embodiment of the present invention will now be described. FIG. 18 is a side view of a power unit 150 according to the second embodiment, showing a state in which a left crank case cover is removed. The power unit 150, like that described in the first embodiment, is also equipped with a water-cooled, V-shaped, 2-cylinder, internal combustion engine, but a main difference is that the power unit 150 has a gear transmission 165.

Figure 19:
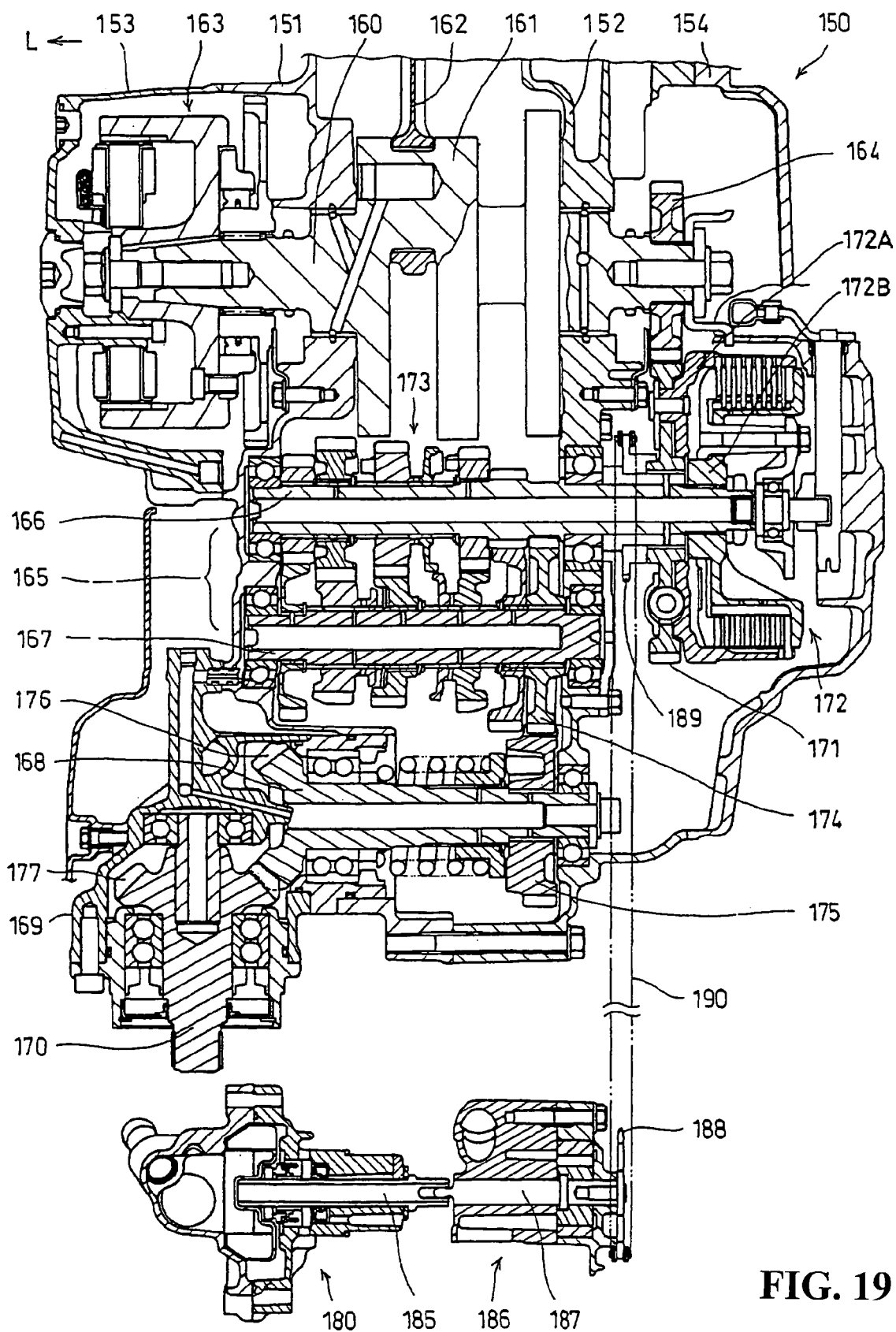
FIG. 19 is a sectional development view taken on line XIX—XIX in FIG. 18.

FIG. 19 is a sectional development view taken on line XIX—XIX in FIG. 18. FIG. 19 is not only a sectional development view including a rear cylinder, a crank shaft, shafts of a transmission, output shaft and connecting shafts, but also shows a section through a water pump shaft.

In FIGS. 18 and 19, the contour of the power unit 150 mainly includes a left crank case 151, a right crank case 152, a left crank case cover 153, a right crank case cover 154, a front cylinder 155F, and a rear cylinder 155R.

A crank shaft 160 is rotatably supported by the left crank case 151 and the right crank case 152, and a connecting rod 162 is connected to a crank pin 161. An AC generator 163 is disposed at the left end portion of the crank shaft 160, while a crank shaft output gear 164 is fixed to the right end portion of the crank shaft 160.

A main shaft 166 of the gear transmission 165, a counter shaft 167 and an output shaft 168 are rotatably supported behind and in parallel with the crank shaft 160 through the left and right crank cases 151, 152 and ball bearings. A connecting shaft support portion 169 is provided outside the left crank case 151, and a connecting shaft 170 that is orthogonal to the output shaft 168 is rotatably provided.

A transmission input gear 171 is fitted on the main shaft 166 at a position close to the right end of the main shaft. The transmission input gear 171 is constantly in mesh with the crank shaft output gear 164 and relatively rotatable in the circumferential direction with respect to the shaft. A multiple disc clutch 172 is provided at the right end of the main shaft 166. The multiple disc clutch 172 is normally engaged, but is released when operated by an operating mechanism. A clutch outer 172A thereof is fixed to the transmission input gear 171, while a clutch inner 172B is fixed to the main shaft 166. Rotation of the crank shaft 160 is transmitted to the transmission input gear 171 through the crank shaft output gear 164 and is then transmitted to the main shaft 166 through the multiple disc clutch 172.

Five gears are mounted on the main shaft 166. Likewise, on the counter shaft 167 there are provided five gears at positions corresponding to the five gears on the main shaft 166 so as to be constantly in mesh with the gears on the main shaft. Power transfer roles of low gear to fifth gear are allocated to those five pairs of gears in a gear group 173.

These ten gears have any of the following three characteristics:

Shaft fixed gear X, a gear fixed to a shaft.

Circumferentially loosely fitted gear Y, a gear held on a shaft through a plain bearing and relatively rotatable in the circumferential direction, but not movable in the axial direction. Fixed to the shaft when engaged with an axially movable gear Z.

Axially movable gear Z, a gear splined to a shaft and movable axially, but failing to be relatively rotate in the circumferential direction with respect to the shaft. When pushed by a bifurcated portion of a shift fork engaged with a circumferential groove, comes into engagement with the circumferentially loosely fitted gear.

When a shifting mechanism (not shown) is operated, a shift fork (not shown) moves along a shift fork support shaft and a selected axially movable gear Z comes into engagement with a selected circumferentially loosely fitted gear Y. As a result, a pair of gears out of the above five pairs of gears are fixed to the respective shafts. At this time, the gear transmission 165 is set at a transmission gear ratio which is determined by the pair of gears, and rotation is transmitted from the main shaft 166 to the counter shaft 167.

A transmission output gear 174 is fitted on the right end portion of the counter shaft 167 and a gear 175 is fitted on the right end portion of the output shaft 168 so as to be engaged with the transmission output gear 174. With these gears, the rotation of the counter shaft 167 is transmitted to the output shaft 168. A bevel gear mounted on the left end of the output shaft 168 and a bevel gear 177 mounted on the front end of the connecting shaft 170 are engaged with each other, whereby the rotation of the output shaft 168 is transmitted to the connecting shaft 170. The rear end of the connecting shaft 170 is connected to the front end of a rear wheel drive shaft (not shown), whereby the rear wheel of the vehicle is driven.

In FIG. 18, a water pump 180 is mounted on a left side face of a lower portion of the left crank case 151. Further, an oil cooler 181 and an oil filter 182 are provided to the rear of the left crank case 151. The water pump 180 and the oil cooler 181 are connected together through a cooling water supply hose 183 and a cooling water return hose 184.

In FIG. 19, the water pump 180 is positioned on the left side with respect to the center of the power unit 150. An oil pump 186 is coaxially disposed on the right side of and adjacent to the water pump 180 and on the right side with respect to the center of the power unit 150. An oil pump 186 is provided in the right crank case 152. A rotary shaft 185 of the water pump 180 and a rotary shaft 187 of the oil pump 186 are connected together interlockedly. An oil pump driven sprocket 188 is disposed at the right end of the rotary shaft 187 of the oil pump 186. An oil pump driving sprocket 189 is mounted on the main shaft 166. The oil pump 186 is activated by the main shaft 166 through an oil pump drive chain 190 which is entrained on the oil pump driven sprocket 188 and also on the oil pump driving sprocket 189.

In the second embodiment described above, since the water pump 180 and the oil cooler 181 are disposed below the crank shaft 160 and the oil cooler 181 is disposed on the rear surface of the power unit 150 in the vehicle advancing direction and below the output shaft 168, the oil cooler 181 can be disposed by utilizing the dead space. In addition, since the water pump 180 can be positioned closer to the oil cooler 181 in comparison with the first embodiment, it is possible to shorten the cooling water passage and simplify the structure.

Since the gear transmission 165 is adopted, the water pump 180 can be disposed by effectively utilizing the resulting empty space on the outer surface of the crank case, thus affording a compact power unit.

Since the oil cooler 181 is spaced away from the internal combustion engine, it is difficult to be influenced by the heat generated from the internal combustion engine and hence it is possible to prevent deterioration of the cooling function of the oil cooler 181.

Since the output shaft 168 of the transmission is disposed at a position higher than the main shaft 166, the transmission input shaft, of the transmission and higher than the counter shaft 167, the overall length of the power unit becomes shorter.

Since the rotary shaft of the oil pump 168 and that of the water pump 180 are coaxially disposed and interlocked with each other, a single drive means suffices in common to both shafts, whereby the structure of the power unit is simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a power unit for a saddle-ride vehicle, comprising:
   an internal combustion engine and a transmission supported by a saddle-ride vehicle body having a front wheel in a front portion thereof;
   a crank shaft adapted to rotate and produce torque, said crank shaft being operatively connected to the internal combustion engine;
   an output shaft disposed in a rear portion of the power unit in a vehicle advancing direction to output the torque produced by the crank shaft to the exterior through the transmission;
   a water pump disposed below the crank shaft and adapted to be rotated with the torque transferred thereto from the crank shaft;
   an oil cooler mounted on a rear surface of the power unit in the vehicle advancing direction below the output shaft and at a position lower than the crank shaft; and
   a left crank case and a right crank case,
   wherein the oil cooler is fixed to a rear surface in a vehicle advancing direction of one of the left and right crank cases,
   wherein the water pump is disposed within the other of the left and right crank cases to which the oil cooler is fixed and is in proximity to the oil cooler, and
   wherein a rotary shaft of the oil pump and a rotary shaft of the water pump are coaxially disposed and interlocked with each other.

2. The power unit for a saddle-ride vehicle according to claim 1, wherein the transmission is accommodated within an internal space formed by combining the left and right crank cases which constitute the power unit,
   the oil pump is disposed within one of the left and right crank cases; and
   the oil cooler is fixed to a rear surface in the vehicle advancing direction of the other of the left and right crank case in which the oil pump is disposed.

3. The power unit for a saddle-ride vehicle according to claim 2, wherein the output shaft of the transmission is disposed at a position higher than an input shaft of the transmission.

4. The power unit for a saddle-ride vehicle according to claim 2, wherein the oil pump and the water pump are rotated together by a drive chain connected to the crank shaft.

5. The power unit for a saddle-ride vehicle according to claim 1, wherein the output shaft of the transmission is disposed at a position higher than an input shaft of the transmission.

6. The power unit for a saddle-ride vehicle according to claim 5, wherein water pump is disposed in the right crank case and is rotated by a chain connected to the crank shaft in the left crank case.

7. The power unit for a saddle-ride vehicle according to claim 5, wherein the oil pump and the water pump are rotated together by a drive chain connected to the crank shaft.

8. The power unit for a saddle-ride vehicle according to claim 1, and further including an oil filter operatively connected to a distal end of the oil cooler for filtering oil.

9. In a power unit for a vehicle, comprising:
   an internal combustion engine and a transmission operatively connected thereto;
   a crank shaft adapted to rotate and produce torque, said crank shaft being operatively connected to the internal combustion engine;
   an output shaft disposed in a rear portion of the power unit in a vehicle advancing direction to output the torque produced by the crank shaft to the exterior through the transmission;
   a water pump disposed below the crank shaft and adapted to be rotated with the torque transferred thereto from the crank shaft;
   an oil cooler mounted on a rear surface of the power unit in a vehicle advancing direction below the output shaft and at a position lower than the crank shaft; and
   a left crank case and a right crank case,
   wherein the transmission is accommodated within an internal space formed by combining the left and right crank cases which constitute the power unit,
   wherein the oil pump is disposed within at least one of the left and right crank cases;
   wherein the oil cooler is fixed to a rear surface in the vehicle advancing direction of the crank case in which the oil pump is disposed, and
   wherein a rotary shaft of the oil pump and a rotary shaft of the water pump are coaxially disposed and interlocked with each other.

10. The power unit for a vehicle according to claim 9, wherein the oil cooler is fixed to a rear surface in the vehicle advancing direction of one of the left crank case and the right crank case, and
    wherein the water pump is disposed within the other of the left crank case and right crank case to which the oil cooler is fixed and is in close proximity to the oil cooler.

11. The power unit for a vehicle according to claim 10, wherein the output shaft of the transmission is disposed at a position higher than an input shaft of the transmission.

12. The power unit for a vehicle according to claim 9, wherein the output shaft of the transmission is disposed at a position higher than an input shaft of the transmission.

13. The power unit for a saddle-ride vehicle according to claim 12, wherein water pump is disposed in the right crank case and is rotated by a chain connected to the crank shaft in the left crank case.

14. The power unit for a vehicle according to claim 9, and further including an oil filter operatively connected to a distal end of the oil cooler for filtering oil.

15. A power unit for a saddle-ride vehicle, comprising:

an internal combustion engine and a transmission supported by a saddle-ride vehicle body having a front wheel in a front portion thereof;

a crank shaft adapted to rotate and produce torque, said crank shaft being operatively connected to the internal combustion engine;

an output shaft disposed in a rear portion of the power unit in a vehicle advancing direction to output the torque produced by the crank shaft to the exterior through the transmission;

a water pump disposed below the crank shaft and adapted to be rotated with the torque transferred thereto from the crank shaft;

an oil cooler mounted on a rear surface of the power unit in the vehicle advancing direction below the output shaft and at a position lower than the crank shaft; and an oil filter operatively connected to a distal end of the oil cooler for filtering oil.

\* \* \* \* \*